(12) United States Patent
Mao et al.

(10) Patent No.: US 8,359,181 B2
(45) Date of Patent: Jan. 22, 2013

(54) FAST CLUSTERING OF POSITION DATA FOR USER PROFILING

(75) Inventors: Yinian Mao, San Diego, CA (US); Gene Marsh, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 12/715,064

(22) Filed: Mar. 1, 2010

(65) Prior Publication Data

US 2011/0213583 A1 Sep. 1, 2011

(51) Int. Cl.
*G06F 19/00* (2011.01)
(52) U.S. Cl. ........................................ 702/150; 707/737
(58) Field of Classification Search .................. 702/150; 707/737
See application file for complete search history.

(56) References Cited

U.S. PATENT DOCUMENTS

2002/0184063 A1 12/2002 Kaufman et al.
2009/0140909 A1 6/2009 Wood et al.

OTHER PUBLICATIONS

Zhou, et al., "Discovering Personal Gazetteers: An Interactive Clustering Approach," 2004, In Proc. of the 12th ACM Intl. Symp. on Advances in Geographic Information Systems.*
Zhou et al., "Mining Personally Important Places from GPS Tracks", Department of Computer Science and Engineering, University of Minnesota, USA, IEEE, 2007, pp. 517-527.
International Search Report and Written Opinion—PCT/US2011/026737—ISA/EPO—Jun. 7, 2011.

* cited by examiner

*Primary Examiner* — Janet Suglo
(74) *Attorney, Agent, or Firm* — Jeffrey D. Jacobs

(57) ABSTRACT

A method of position clustering includes maintaining a set of clusters by storing a rectangular boundary of each cluster in the set of clusters, a centroid within each cluster, and a number of the points within each cluster. The method further includes adding a point to a cluster in the set of clusters when the cluster bounds the point by adjusting the rectangular boundary of the cluster, the centroid within the cluster, and the number of the points within the cluster.

60 Claims, 10 Drawing Sheets

FAST CLUSTERING OF POSITION DATA FOR USER PROFILING

BACKGROUND

1. Field

The following description relates generally to wireless communication and, more particularly, to a method of position clustering.

2. Background

A position clustering algorithm is provided in "Mining Personally Important Places from GPS Tracks," Zhou et al., International Conference on Data Engineering, pp. 517-526, ISBN# 978-1-4244-0382-0. The position clustering algorithm, which is called DJ Cluster, stores each GPS point so that it may loop through each GPS point to calculate a neighborhood at a center point with a particular radius. The DJ Cluster algorithm is not sufficiently efficient to run on a cell phone. As such, a more efficient position clustering algorithm is needed.

SUMMARY

In an aspect of the disclosure, a method of position clustering includes maintaining a set of clusters by storing a rectangular boundary of each cluster in the set of clusters, a centroid within each cluster, and a number of the points within each cluster. The method further includes adding a point to a cluster in the set of clusters when the cluster bounds the point by adjusting the rectangular boundary of the cluster, the centroid within the cluster, and the number of the points within the cluster.

In an aspect of the disclosure, a method of providing position clustering data in a wireless terminal includes maintaining a set of clusters by storing a rectangular boundary of each cluster in the set of clusters, a centroid within each cluster, and a number of the points within each cluster; periodically obtaining GPS coordinates of the wireless terminal, the GPS coordinates comprising a latitude and a longitude of a position of the wireless terminal, each latitude and longitude pair being a point; creating a new cluster in the set of clusters when an obtained point is not bound by any cluster in the set of clusters; adding an obtained point to a cluster in the set of clusters when the cluster bounds the obtained point by adjusting the rectangular boundary of the cluster, the centroid within the cluster, and the number of the points within the cluster; merging a first cluster and a second cluster in the set of clusters into a new cluster when an obtained point is bound by each of the first cluster and the second cluster; and displaying the set of clusters on a display of the wireless terminal.

In an aspect of the disclosure, an apparatus for wireless communication includes means for maintaining a set of clusters by storing a rectangular boundary of each cluster in the set of clusters, a centroid within each cluster, and a number of the points within each cluster; and means for adding a point to a cluster in the set of clusters when the cluster bounds the point by adjusting the rectangular boundary of the cluster, the centroid within the cluster, and the number of the points within the cluster.

In an aspect of the disclosure, an apparatus for wireless communication includes means for maintaining a set of clusters by storing a rectangular boundary of each cluster in the set of clusters, a centroid within each cluster, and a number of the points within each cluster; means for periodically obtaining GPS coordinates of the apparatus, the GPS coordinates comprising a latitude and a longitude of a position of the apparatus, each latitude and longitude pair being a point; means for creating a new cluster in the set of clusters when an obtained point is not bound by any cluster in the set of clusters; means for adding an obtained point to a cluster in the set of clusters when the cluster bounds the obtained point by adjusting the rectangular boundary of the cluster, the centroid within the cluster, and the number of the points within the cluster; means for merging a first cluster and a second cluster in the set of clusters into a new cluster when an obtained point is bound by each of the first cluster and the second cluster; and means for displaying the set of clusters on a display of the apparatus.

In an aspect of the disclosure, an apparatus for wireless communication includes a processing system. The processing system is configured to maintain a set of clusters by storing a rectangular boundary of each cluster in the set of clusters, a centroid within each cluster, and a number of the points within each cluster. The processing system is further configured to add a point to a cluster in the set of clusters when the cluster bounds the point by adjusting the rectangular boundary of the cluster, the centroid within the cluster, and the number of the points within the cluster.

In an aspect of the disclosure, an apparatus for wireless communication includes a processing system. The processing system is configured to maintain a set of clusters by storing a rectangular boundary of each cluster in the set of clusters, a centroid within each cluster, and a number of the points within each cluster; to obtain periodically GPS coordinates of the wireless terminal, the GPS coordinates comprising a latitude and a longitude of a position of the wireless terminal, each latitude and longitude pair being a point; to create a new cluster in the set of clusters when an obtained point is not bound by any cluster in the set of clusters; to add an obtained point to a cluster in the set of clusters when the cluster bounds the obtained point by adjusting the rectangular boundary of the cluster, the centroid within the cluster, and the number of the points within the cluster; to merge a first cluster and a second cluster in the set of clusters into a new cluster when an obtained point is bound by each of the first cluster and the second cluster; and to display the set of clusters on a display of the wireless terminal.

In an aspect of the disclosure, a computer program product includes a computer-readable medium. The computer-readable medium includes code for maintaining a set of clusters by storing a rectangular boundary of each cluster in the set of clusters, a centroid within each cluster, and a number of the points within each cluster. The computer-readable medium further includes code for adding a point to a cluster in the set of clusters when the cluster bounds the point by adjusting the rectangular boundary of the cluster, the centroid within the cluster, and the number of the points within the cluster.

In an aspect of the disclosure, a computer program product includes a computer-readable medium. The computer-readable medium includes code for maintaining a set of clusters by storing a rectangular boundary of each cluster in the set of clusters, a centroid within each cluster, and a number of the points within each cluster; for periodically obtaining GPS coordinates of a wireless terminal, the GPS coordinates comprising a latitude and a longitude of a position of the wireless terminal, each latitude and longitude pair being a point; for creating a new cluster in the set of clusters when an obtained point is not bound by any cluster in the set of clusters; for adding an obtained point to a cluster in the set of clusters when the cluster bounds the obtained point by adjusting the rectangular boundary of the cluster, the centroid within the cluster, and the number of the points within the cluster; for merging a first cluster and a second cluster in the set of clusters into a new cluster when an obtained point is bound by each of the first cluster and the second cluster; and for displaying the set of clusters on a display of the wireless terminal.

DETAILED DESCRIPTION

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Examples of apparatuses suitable for incorporating various aspects of the invention include, but are not limited to, a UE capable of operating in a wireless network. A UE may be referred to as a mobile phone, user terminal, a mobile station, a mobile device, a subscriber station, a wireless device, a terminal, an access terminal, a node, a handheld device, or some other suitable terminology. The various concepts described throughout this disclosure are intended to apply to all suitable apparatuses regardless of their specific nomenclature.

Figure 1:
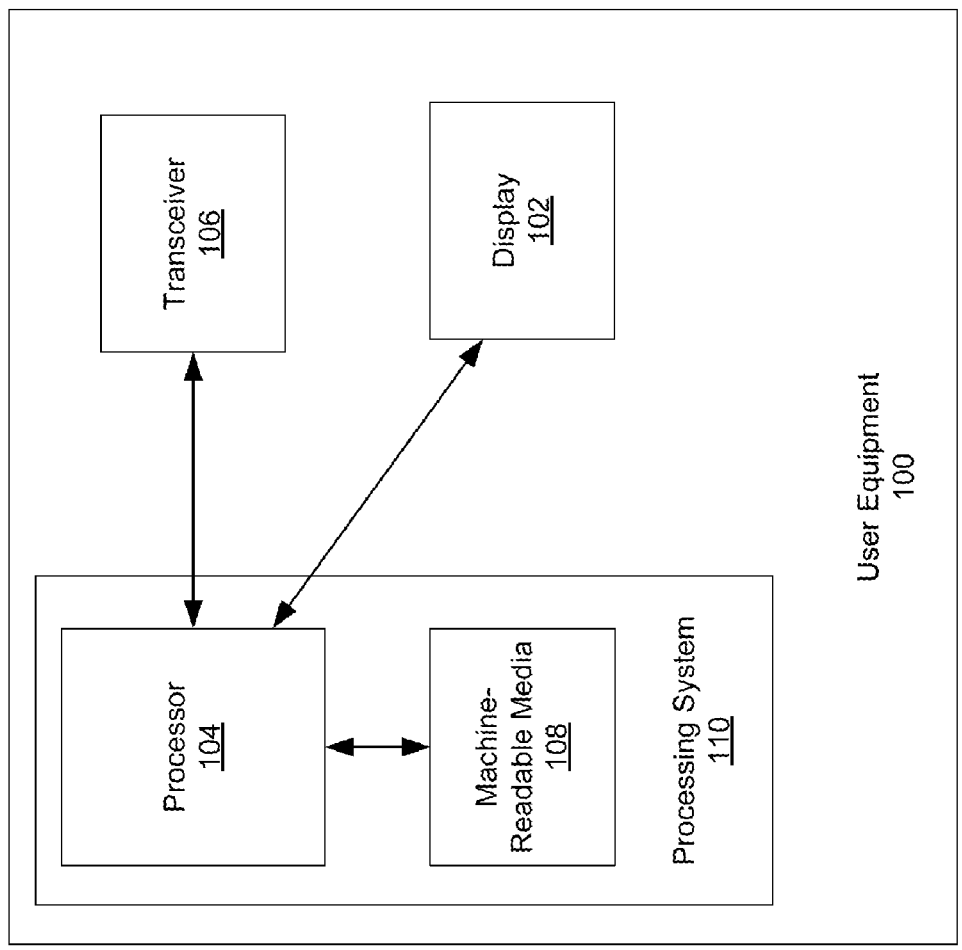
FIG. 1 is a block diagram illustrating a hardware configuration for an exemplary apparatus.

Various aspects of an apparatus will now be presented with reference to FIG. 1. FIG. 1 is a conceptual block diagram illustrating a hardware configuration for an apparatus. The apparatus 100 includes a processor 104, machine-readable media (memory) 108 coupled to the processor 104, a display 102 coupled to the processor 104, and a transceiver 106 coupled to the processor 104. The transceiver 106 includes a GPS receiver. The processor 104 and the machine-readable media 108 may together be referred to as a processing system 110. However, the processing system 110 may include the processor 104 without the machine-readable media 108 for certain processor 104 configurations.

The processing system 110 may include one or more processors. The one or more processors may be implemented with any combination of general-purpose microprocessors, microcontrollers, a Digital Signal Processors (DSP), Field Programmable Gate Arrays (FPGA), Programmable Logic Devices (PLD), controllers, state machines, gated logic, discrete hardware components, or any other suitable entities that can perform calculations or other manipulations of information.

The processing system 110 may also include the machine-readable media 108 for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 110 to perform the various functions described below, as well as other protocol processing functions.

The machine-readable media 108 may include storage integrated into one or more of the processors. The machine-readable media 108 may also include storage external to the one or more processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, the machine-readable media 108 may include a transmission line or a carrier wave that encodes a data signal. Those skilled in the art will recognize how best to implement the described functionality for the processing system.

Figure 2:
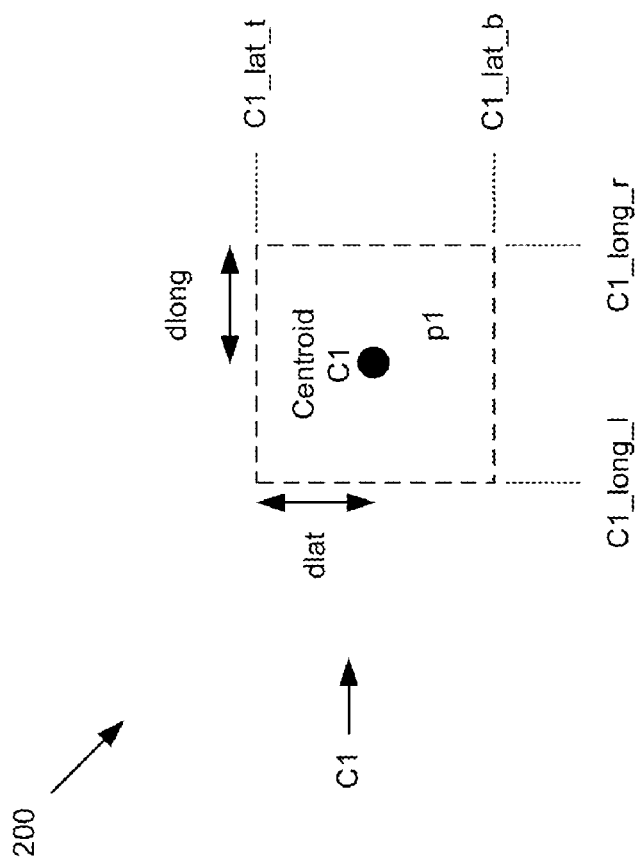
FIG. 2 is a first diagram illustrating an exemplary method.

FIG. 2 is a diagram 200 illustrating an exemplary method. Assume that P is a set of points to be processed. Each point is comprised of a latitude, a longitude, and a time, and therefore defines a location of the UE 100 at a particular time. Assume C is the collection of clusters. If P is the first set of points to be processed, C is initialized to the empty set. A cluster is defined by a rectangle, a centroid, and a number of points N. The rectangle is defined by four values: left longitude (long_l), right longitude (long_r), bottom latitude (lat_b), and top latitude (lat_t). The centroid is defined by a latitude and a longitude and is an average latitude and longitude (i.e., a density center) of the points in the cluster. The centroid is always within the rectangle. The number of points N is an integer greater than zero. When points are added to a cluster or two clusters are merged, the boundaries of the respective rectangle are defined with respect to two constants: a latitude distance (dlat) and a longitude distance (dlong). For each point p in P, the UE 100 determines whether p is contained in the rectangle of each cluster in the collection of clusters C. If p is bounded by a cluster, p is added to the cluster. If more than one cluster bounds p, those clusters are merged together. If no cluster bounds p, a new cluster is created containing the point p.

As shown in FIG. 2, a point p1 is not bound by any clusters, and therefore a new cluster C1 is created containing the point p1. The cluster C1 is defined by the centroid C1, which is equal to the latitude and longitude of the point p1. The edges of the rectangle are set such that the top latitude (C1_lat_t) and the bottom latitude (C1_lat_b) are dlat from the centroid C1 and the left longitude (C1_long_l) and the right longitude (C1_long_r) are dlong from the centroid C1. The number of points N in the cluster C1 is set to one.

Figure 3:
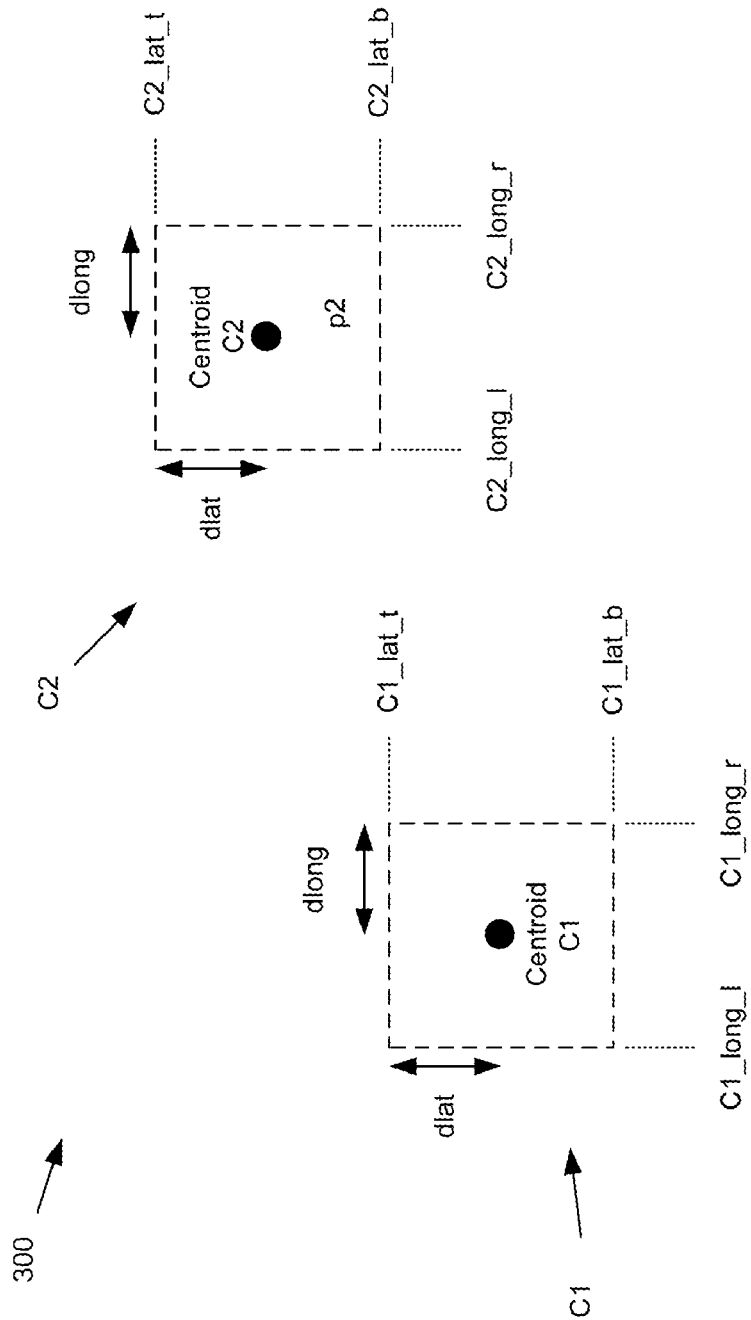
FIG. 3 is a second diagram illustrating the exemplary method.

FIG. 3 is a diagram 300 illustrating the exemplary method. As shown in FIG. 3, point p2 is not bound by any clusters, and therefore a new cluster C2 is created containing the point p2. The cluster C2 is defined by the centroid C2, which is equal to the latitude and the longitude of the point p2. The edges of the rectangle are set such that the top latitude (C2_lat_t) and the bottom latitude (C2_lat_b) are dlat from the centroid C2 and the left longitude (C2_long_l) and the right longitude (C2_long_r) are dlong from the centroid C2. The number of points N in the cluster C2 is set to one.

Figure 4:
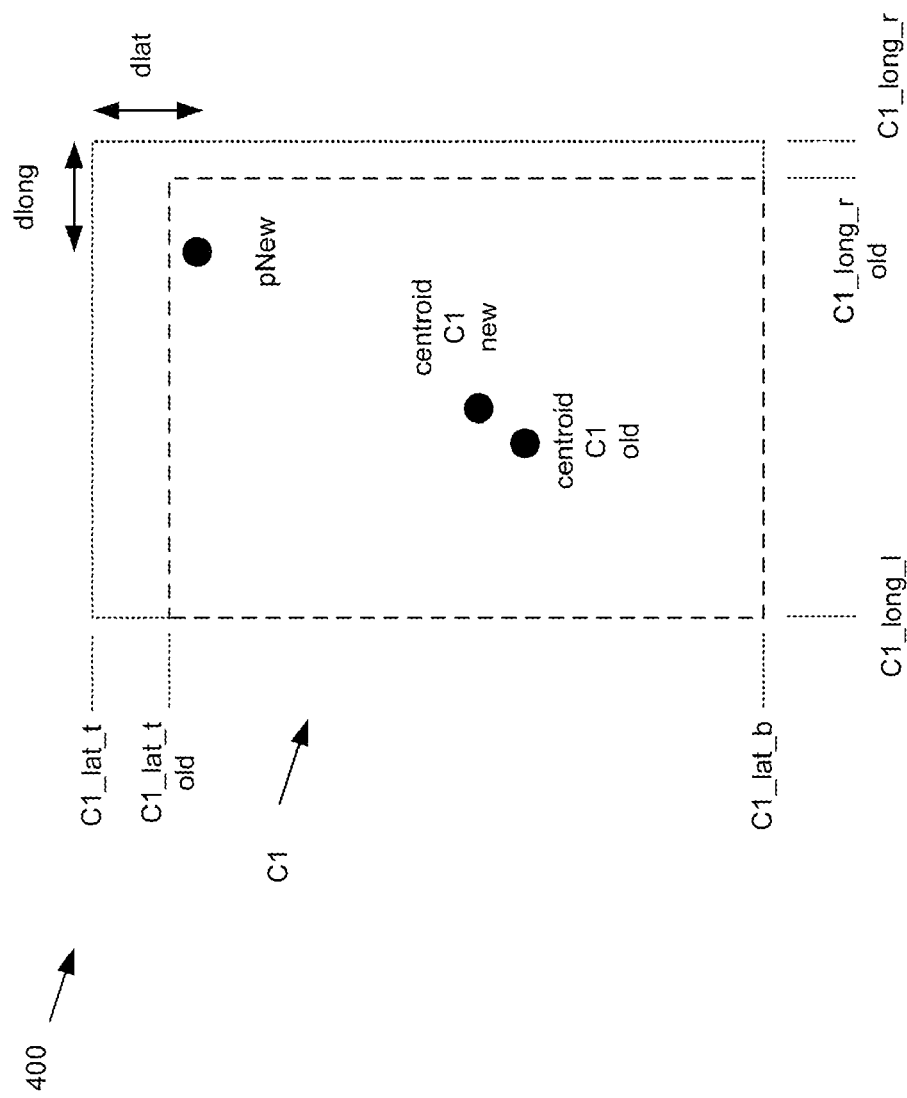
FIG. 4 is a third diagram illustrating the exemplary method.

FIG. 4 is a diagram 400 illustrating the exemplary method. The exemplary method allows for clusters to grow and be redefined with the addition of points without keeping information on the points previously added to the cluster. As such, the exemplary method may be implemented efficiently, as less computations are needed to grow and redefine a cluster. As shown in FIG. 4, a new point $p_{new}$ is bound by the cluster C1, and therefore is added to the cluster C1. The top latitude and bottom latitude are adjusted if they are within dlat of the new point $p_{new}$. The left longitude and right longitude are adjusted if they are within dlong of the new point $p_{new}$. In summary, the following adjustments are made to the top latitude, bottom latitude, left longitude, and right longitude:

C1_long_l=$p_{new}$.lonitude−dlong  if  $p_{new}$.longitude−C1_long_l<dlong,

C1_long_r=$p_{new}$.lontitude+dlong  if  C1_long_r−$p_{new}$.longitude<dlong,

C1_lat_b=$p_{new}$.latitude−dlat  if  $p_{new}$.latitude−C1_lat_b<dlat,

C1_lat_t=$p_{new}$.latitude+dlat if C1_lat_t−$p_{new}$.latitude<dlat.

In FIG. 4, the top latitude (C1_lat_t) and the right longitude (C1_long_r) are adjusted so that they are dlat and dlong, respectively, from the new point $p_{new}$. The centroid is adjusted as follows:

centroid.latitude$_{new}$=(N*centroid.latitude+$p_{new}$.latitude)/(N+1), and centroid.longitude$_{new}$=(N*centroid.longitude+$p_{new}$.longitude)/(N+1).

The number of points N is set equal to N+1.

Figure 5:
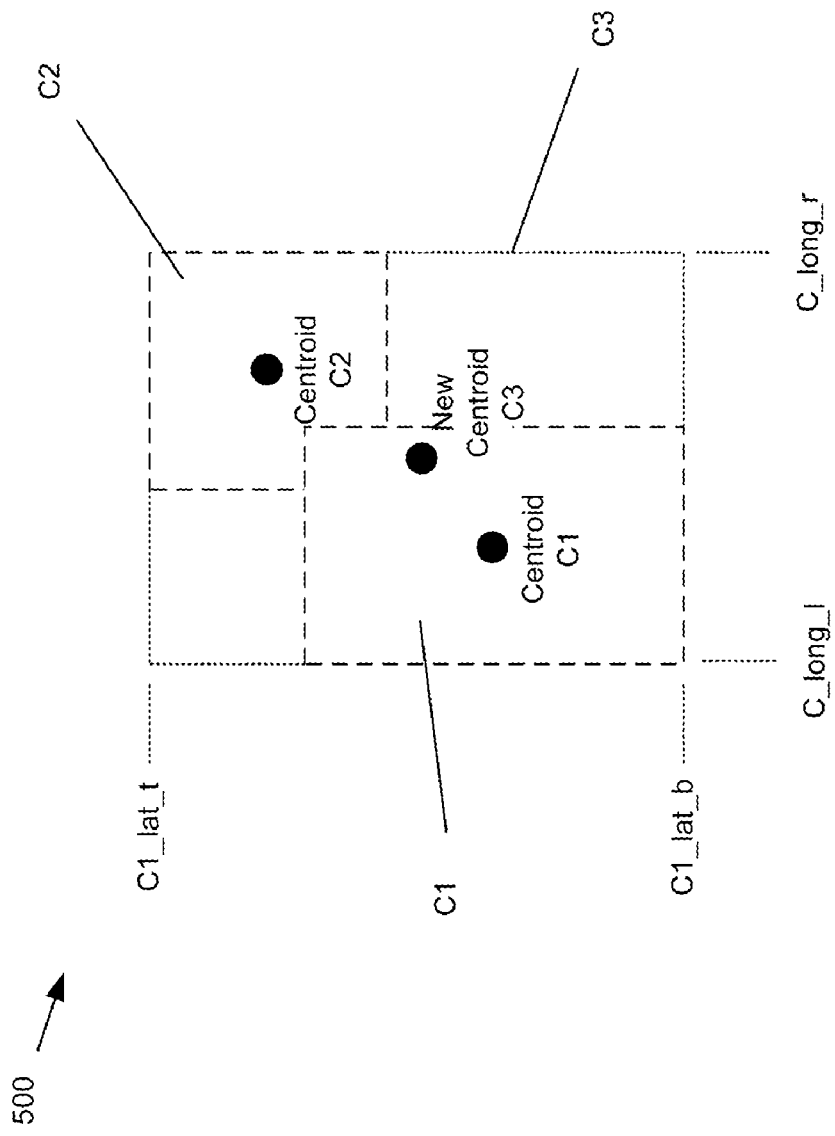
FIG. 5 is a fourth diagram illustrating the exemplary method.

FIG. 5 is a diagram 500 illustrating the exemplary method. If a point is bounded by more than one cluster, the clusters that bound the point are merged. As shown in FIG. 5, clusters C1 and C2 are merged together to form cluster C3. Cluster C3 is a union of the two clusters C1, C2. That is, the top latitude, bottom latitude, left longitude, and right longitude of C3 are set to the topmost of the top latitudes of C1 and C2, the bottommost of the bottom latitudes of C1 and C2, the leftmost of the left longitudes of C1 and C2, and the rightmost of the right latitudes of C1 and C2, respectively. The centroid C3 is computed as follows:

$$C3.\text{centroid.latitude} = \left(\frac{C1.N * C1.\text{centroid.latitude} + C2.N * C2.\text{centroid.latitude}}{C1.N + C2.N}\right),$$

and $$C3.\text{centroid.longitude} = \left(\frac{C1.N * C1.\text{centroid.longitude} + C2.N * C2.\text{centroid.longitude}}{C1.N + C2.N}\right).$$

The number of points N in C3 is set to the number of points in C1 plus the number of points in C2.

Figure 6:
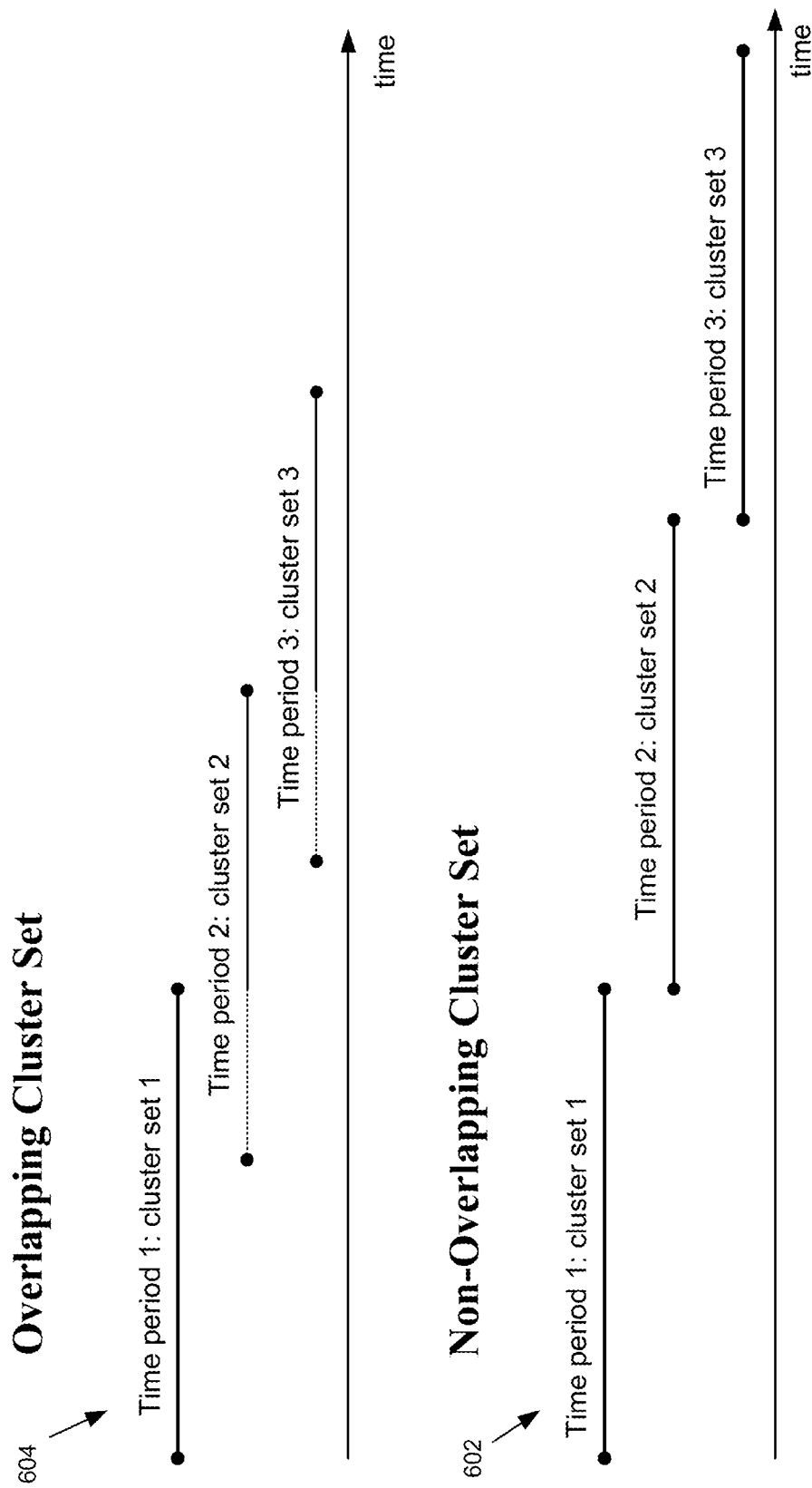
FIG. 6 is a fifth diagram illustrating a configuration of the exemplary method.

FIG. 6 is a fifth diagram illustrating a configuration of the exemplary method. As discussed supra, each point is associated with a latitude, a longitude, and a time. The time element allows for clusters to be phased out after a particular time period and new clusters to be phased in depending on the time. Essentially, the time element allows clusters to be "fresh" in order to represent recent user activity. In one configuration, clusters are phased out after a particular time period and new clusters are started at the expiration of the time period. The time period may be, for example, 60 days. In such a configuration, old clusters are disregarded after the time period and new clusters are then started with the newly obtained GPS coordinates. An example of such a configuration is shown in diagram 602 of FIG. 6. In another configuration, as the expiration time of an old cluster set approaches, a new cluster set is started with the newly obtained GPS coordinates. The new cluster set is not displayed or provided to the user until the old cluster set is disregarded. An example of such a configuration is shown in diagram 604 of FIG. 6. In the diagram 604, at the time of the dotted line, the particular cluster is not displayed or provided to the user.

In another configuration, new cluster sets are started periodically, such as, for example, every 60 days. However, the new cluster sets are started from the largest five or so cluster sets. In such a configuration, the number of points in the largest five cluster sets may be reduced. In yet another configuration, clusters which acquire no new points after a specified time period are dropped.

Figure 7:
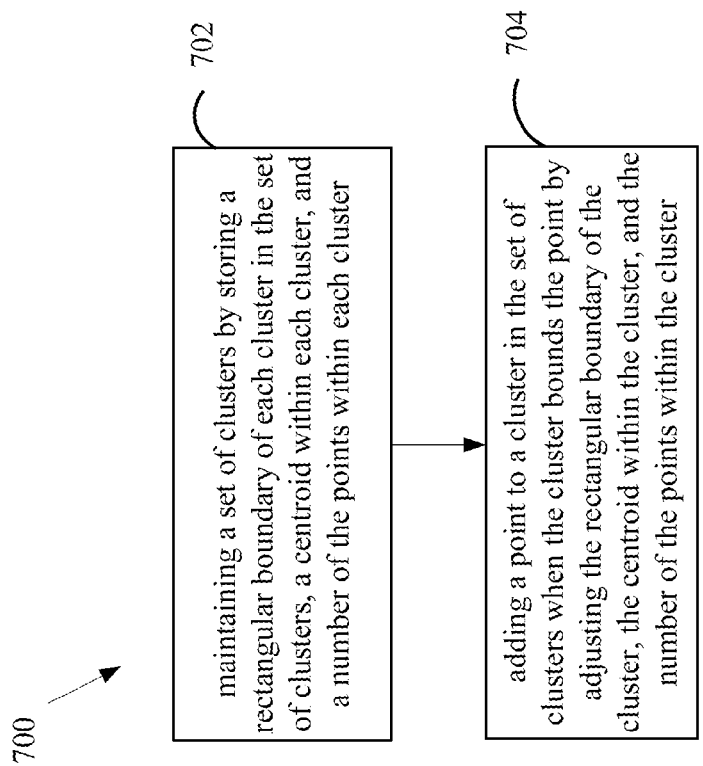
FIG. 7 is a flow chart of an exemplary method.

FIG. 7 is a flow chart 700 of an exemplary method. The method includes maintaining a set of clusters by storing a rectangular boundary of each cluster in the set of clusters, a centroid within each cluster, and a number of the points within each cluster (702). The method further includes adding a point to a cluster in the set of clusters when the cluster bounds the point by adjusting the rectangular boundary of the cluster, the centroid within the cluster, and the number of the points within the cluster (704).

In one configuration, each point comprises a latitude, a longitude, and a time of acquisition. In one configuration, the rectangular boundary is defined by a first latitude, a second latitude north of the first latitude, a first longitude, and a second longitude east of the first longitude. In one configuration, when the point is added to the cluster, the rectangular boundary is adjusted as follows:

the first longitude is set equal to the longitude of the point minus a predetermined longitude distance when the longitude of the point minus the first longitude is less than the predetermined longitude distance;

the second longitude is set equal to the longitude of the point plus the predetermined longitude distance when the second longitude minus the longitude of the point is less than the predetermined longitude distance;

the first latitude is set equal to the latitude of the point minus a predetermined latitude distance when the latitude of the point minus the first latitude is less than a predetermined latitude distance; and the second latitude is set equal to the latitude of the point plus the predetermined latitude distance when the second latitude minus the latitude of the point is less than the predetermined latitude distance.

In one configuration, when the point is added to the cluster, the number of points within the cluster is incremented by one. In one configuration, the centroid is an average latitude and an average longitude of the points within the cluster, and when the point is added to the cluster, the centroid is adjusted as follows:

$$\text{centroid.latitude}_{new} = (N*\text{centroid.latitude} + \text{p.latitude})/(N+1), \text{ and}$$

$$\text{centroid.longitude}_{new} = (N*\text{centroid.longitude} + \text{p.longitude})/(N+1)'$$

where centroid.latitude is the latitude of the centroid of the cluster before the point is added to the cluster, centroid.longitude is the longitude of the centroid of the cluster before the point is added to the cluster, p.latitude is the latitude of the point, p.longitude is the longitude of the point, and N is the number of points in the cluster before the point is added to the cluster.

In one configuration, the method further includes creating a new cluster in the set of clusters when a new point is not bound by a cluster in the set of clusters. In one configuration, the new point includes a latitude and a longitude; the centroid of the new cluster includes the latitude and the longitude of the new point; and the rectangular boundary is defined by a westernmost longitude equal to the longitude of the new point minus a predetermined longitude distance, an easternmost longitude equal to the longitude of the new point plus the predetermined longitude distance, a southernmost latitude equal to the latitude of the new point minus a predetermined latitude distance, and a northernmost latitude equal to the latitude of the new point plus the predetermined latitude distance.

In one configuration, the method further includes merging a first cluster and a second cluster in the set of clusters into a new cluster when a new point is bound by each of the first cluster and the second cluster. In one configuration, the rectangular boundary of the new cluster is defined by a north latitude, a south latitude, a west longitude, and an east longitude equal to a northernmost latitude, a southernmost latitude, a westernmost longitude, and an easternmost longitude, respectively, of the first cluster and the second cluster. In addition, the centroid of the new cluster is computed as follows:

$$\text{centroid.latitude} = \left( \frac{C1.N * C1.\text{centroid.latitude} + C2.N * C2.\text{centroid.latitude}}{C1 \cdot N + C2 \cdot N} \right),$$

and $$\text{centroid.longitude} = \left( \frac{C1.N * C1.\text{centroid.longitude} + C2.N * C2.\text{centroid.longitude}}{C1.N + C2.N} \right),$$

where centroid.latitude and centroid.longitude are the latitude and the longitude, respectively, of the centroid of the new cluster; C1.N is the number of points in the first cluster; C1.centroid.latitude and C1.centroid.longitude are the latitude and the longitude, respectively, of the centroid of the first cluster; C2.N is the number of points in the second cluster; and C2.centroid.latitude and C2.centroid.longitude are the latitude and the longitude, respectively, of the centroid of the second cluster. Furthermore, the number of points N of the new cluster is computed as follows: N=C1.N+C2.N.

In one configuration, each point comprises a latitude, a longitude, and a time, and wherein the set of clusters are maintained based on an age of the cluster. In one configuration, at an end of a periodic predetermined time period, all clusters in the set of clusters are deleted, and the set of clusters is populated with new clusters formed with newly acquired points. In one configuration, at an end of a periodic predetermined time period, all clusters in the set of clusters are deleted, and the set of clusters is populated with new clusters formed with points acquired in a time period before the end of the corresponding predetermined time period. In one configuration, at an end of a periodic predetermined time period, a set of the clusters with a least number of points in the set of clusters is deleted. A new set of clusters can start from the remaining clusters that were not deleted.

Figure 8:
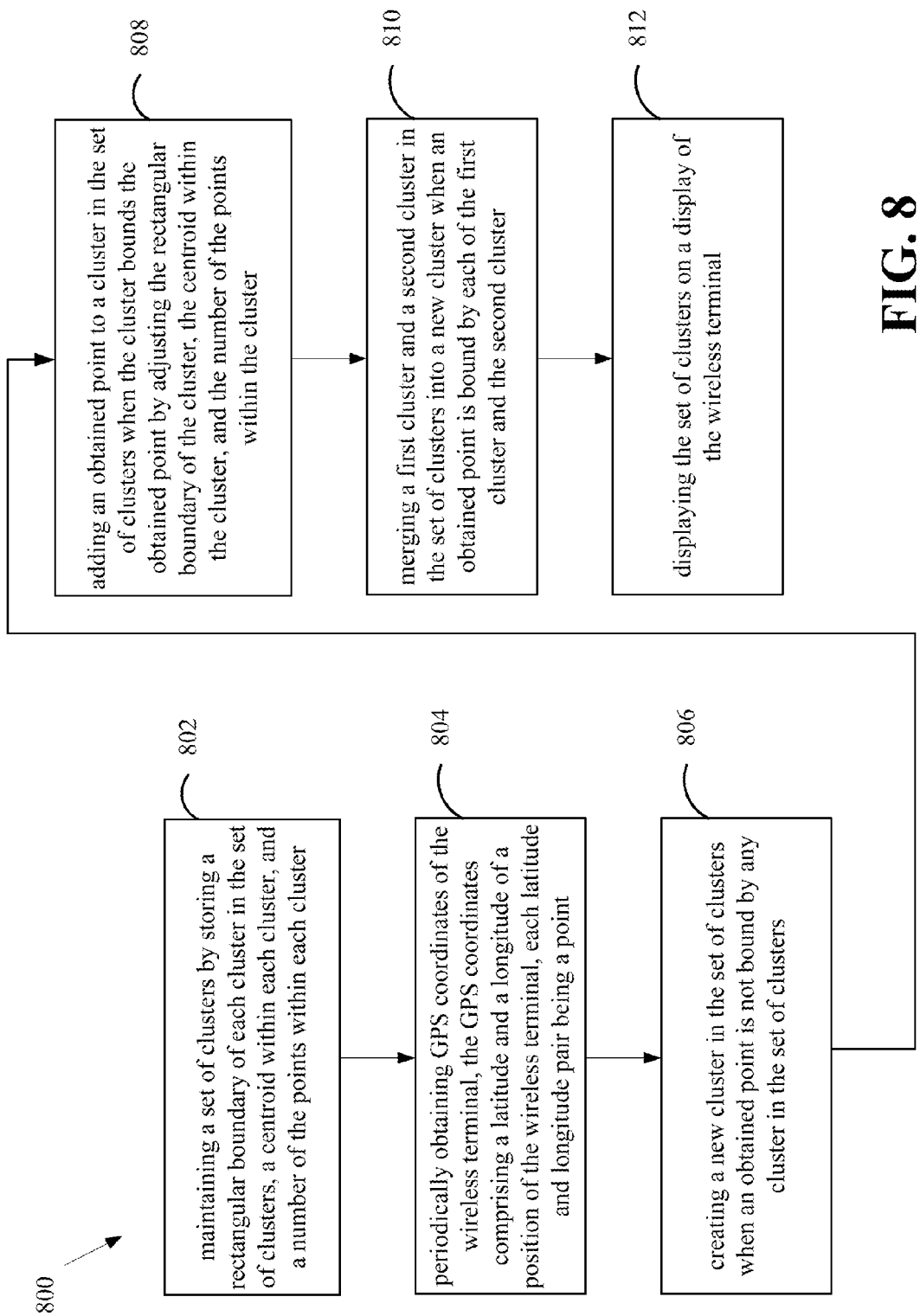
FIG. 8 is another flow chart of an exemplary method.

FIG. 8 is a flow chart 800 of an exemplary method. The method includes maintaining a set of clusters by storing a rectangular boundary of each cluster in the set of clusters, a centroid within each cluster, and a number of the points within each cluster (802); periodically obtaining GPS coordinates of the wireless terminal, the GPS coordinates comprising a latitude and a longitude of a position of the wireless terminal, each latitude and longitude pair being a point (804); creating a new cluster in the set of clusters when an obtained point is not bound by any cluster in the set of clusters (806); adding an obtained point to a cluster in the set of clusters when the cluster bounds the obtained point by adjusting the rectangular boundary of the cluster, the centroid within the cluster, and the number of the points within the cluster (808); merging a first cluster and a second cluster in the set of clusters into a new cluster when an obtained point is bound by each of the first cluster and the second cluster (810); and displaying the set of clusters on a display of the wireless terminal (812).

Figure 9:
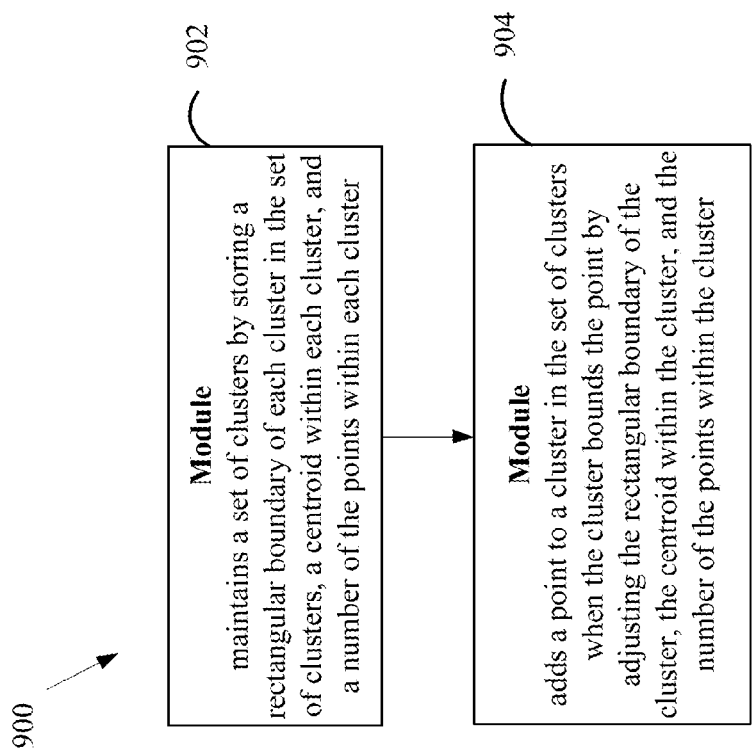
FIG. 9 is a modular diagram of an exemplary apparatus.

FIG. 9 is a modular diagram 900 of an exemplary apparatus 100. The exemplary apparatus 100 includes a module 902 that maintains a set of clusters by storing a rectangular boundary of each cluster in the set of clusters, a centroid within each cluster, and a number of the points within each cluster. The exemplary apparatus 100 further includes a module 904 that adds a point to a cluster in the set of clusters when the cluster bounds the point by adjusting the rectangular boundary of the cluster, the centroid within the cluster, and the number of the points within the cluster.

Figure 10:
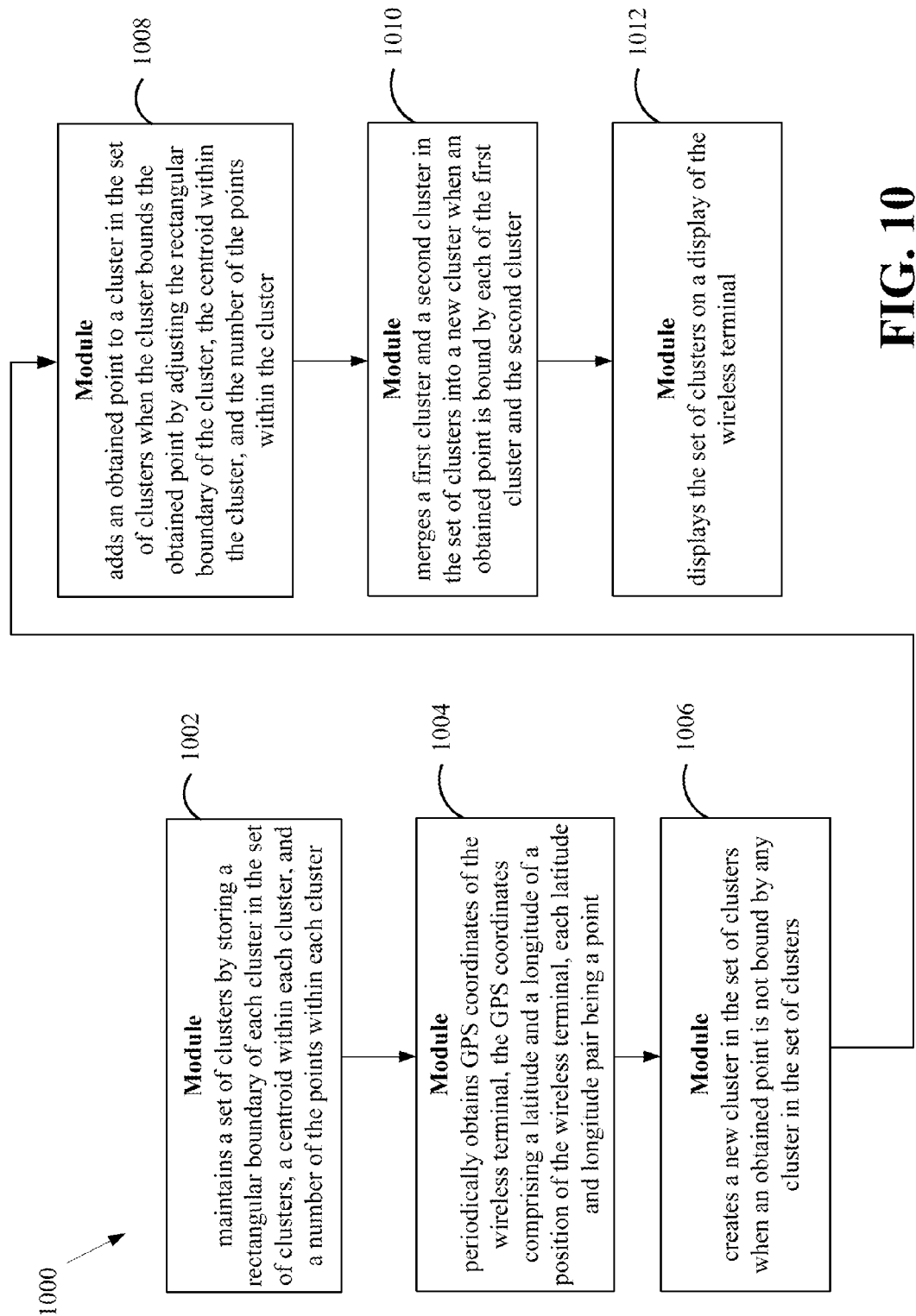
FIG. 10 is another modular diagram of an exemplary apparatus.

FIG. 10 is a modular diagram 1000 of an exemplary apparatus 100. The exemplary apparatus 100 includes a module 1002 that maintains a set of clusters by storing a rectangular boundary of each cluster in the set of clusters, a centroid within each cluster, and a number of the points within each cluster; a module 1004 that periodically obtaining GPS coordinates of the wireless terminal, the GPS coordinates comprising a latitude and a longitude of a position of the wireless terminal, each latitude and longitude pair being a point; a module 1006 that creates a new cluster in the set of clusters when an obtained point is not bound by any cluster in the set of clusters; a module 1008 that adds an obtained point to a cluster in the set of clusters when the cluster bounds the obtained point by adjusting the rectangular boundary of the cluster, the centroid within the cluster, and the number of the points within the cluster; a module 1010 that merges a first cluster and a second cluster in the set of clusters into a new cluster when an obtained point is bound by each of the first cluster and the second cluster; and a module 1012 that displays the set of clusters on a display of the wireless terminal.

In one configuration, an apparatus includes means for maintaining a set of clusters by storing a rectangular boundary of each cluster in the set of clusters, a centroid within each cluster, and a number of the points within each cluster; and means for adding a point to a cluster in the set of clusters when the cluster bounds the point by adjusting the rectangular boundary of the cluster, the centroid within the cluster, and the number of the points within the cluster. In one configuration, an apparatus includes means for maintaining a set of clusters by storing a rectangular boundary of each cluster in the set of clusters, a centroid within each cluster, and a number of the points within each cluster; means for periodically obtaining GPS coordinates of the apparatus, the GPS coordinates comprising a latitude and a longitude of a position of the apparatus, each latitude and longitude pair being a point; means for creating a new cluster in the set of clusters when an obtained point is not bound by any cluster in the set of clusters; means for adding an obtained point to a cluster in the set of clusters when the cluster bounds the obtained point by adjusting the rectangular boundary of the cluster, the centroid within the cluster, and the number of the points within the cluster; means for merging a first cluster and a second cluster in the set of clusters into a new cluster when an obtained point is bound by each of the first cluster and the second cluster; and means for displaying the set of clusters on a display of the apparatus. The aforementioned means is the processing system 110 configured to perform the function identified in each of the aforementioned means. Specifically, the aforementioned means in the processor 104 configured to perform the function identified in each of the aforementioned means.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of position clustering, comprising:
maintaining a set of clusters in a processing system by storing a rectangular boundary of each cluster in the set of clusters, a centroid within each cluster, and a number of the points within each cluster; and
adding a point to a cluster in the set of clusters when the cluster bounds the point by adjusting the rectangular boundary of the cluster, adjusting the centroid within the cluster, and adjusting the number of the points within the cluster, wherein one or more of the adjusting the rectangular boundary and the adjusting the centroid is based respectively on a predetermined distance from the point being added, and on a latitude and a longitude of the points in the cluster.

2. The method of claim 1, wherein each point comprises a latitude, a longitude, and a time of acquisition.

3. The method of claim 2, wherein the rectangular boundary is defined by a first latitude, a second latitude north of the first latitude, a first longitude, and a second longitude east of the first longitude.

4. The method of claim 3, wherein the predetermined distance is one or more of a predetermined longitude distance and a predetermined latitude distance and when the point is added to the cluster, the rectangular boundary is adjusted as follows:
the first longitude is set equal to the longitude of the point minus the predetermined longitude distance when the longitude of the point minus the first longitude is less than the predetermined longitude distance,
the second longitude is set equal to the longitude of the point plus the predetermined longitude distance when the second longitude minus the longitude of the point is less than the predetermined longitude distance,
the first latitude is set equal to the latitude of the point minus the predetermined latitude distance when the latitude of the point minus the first latitude is less than a predetermined latitude distance, and
the second latitude is set equal to the latitude of the point plus the predetermined latitude distance when the second latitude minus the latitude of the point is less than the predetermined latitude distance.

5. The method of claim 1, wherein when the point is added to the cluster, the number of points within the cluster is incremented by one.

6. The method of claim 1, wherein the centroid is an average latitude and an average longitude of the points within the cluster, and when the point is added to the cluster, the centroid is adjusted as follows:

$$\text{centroid.latitude}_{new} = (N^*\text{centroid.latitude} + p.\text{latitude})/(N+1), \text{ and}$$

$$\text{centroid.longitude}_{new} = (N^*\text{centroid.longitude} + p.\text{longitude})/(N+1),$$

where centroid.latitude is the latitude of the centroid of the cluster before the point is added to the cluster, centroid.longitude is the longitude of the centroid of the cluster before the point is added to the cluster, p.latitude is the latitude of the point, p.longitude is the longitude of the point, and N is the number of points in the cluster before the point is added to the cluster.

7. The method of claim 1, further comprising creating a new cluster in the set of clusters when a new point is not bound by a cluster in the set of clusters.

8. The method of claim 7, wherein:
the new point comprises a latitude and a longitude;
the centroid of the new cluster comprises the latitude and the longitude of the new point;
the predetermined distance is one or more of a predetermined longitude distance and a predetermined latitude distance; and
the rectangular boundary is defined by a westernmost longitude equal to the longitude of the new point minus the predetermined longitude distance, an easternmost longitude equal to the longitude of the new point plus the predetermined longitude distance, a southernmost latitude equal to the latitude of the new point minus the predetermined latitude distance, and a northernmost latitude equal to the latitude of the new point plus the predetermined latitude distance.

9. The method of claim 1, further comprising merging a first cluster and a second cluster in the set of clusters into a new cluster when a new point is bound by each of the first cluster and the second cluster.

10. The method of claim 9, wherein:
the rectangular boundary of the new cluster is defined by a north latitude, a south latitude, a west longitude, and an east longitude equal to a northernmost latitude, a southernmost latitude, a westernmost longitude, and an easternmost longitude, respectively, of the first cluster and the second cluster;

the centroid of the new cluster is computed as follows:

$$\text{centroid.latitude} = \left( \frac{C1.N * C1.\text{centroid.latitude} + C2.N * C2.\text{centroid.latitude}}{C1.N + C2.N} \right),$$

and $$\text{centroid.longitude} = \left( \frac{C1.N * C1.\text{centroid.longitude} + C2.N * C2.\text{centroid.longitude}}{C1.N + C2.N} \right),$$

where centroid.latitude and centroid.longitude are the latitude and the longitude, respectively, of the centroid of the new cluster; C1.N is the number of points in the first cluster; C1.centroid.latitude and C1.centroid.longitude are the latitude and the longitude, respectively, of the centroid of the first cluster; C2.N is the number of points in the second cluster; and C2.centroid.latitude and C2.centroid.longitude are the latitude and the longitude, respectively, of the centroid of the second cluster; and the number of points N of the new cluster is computed as follows: N=C1.N+C2.N.

11. The method of claim 1, wherein each point comprises a latitude, a longitude, and a time, and wherein the set of clusters are maintained based on an age of the cluster.

12. The method of claim 11, wherein at an end of a periodic predetermined time period, all clusters in the set of clusters are deleted, and the set of clusters is populated with new clusters formed with newly acquired points.

13. The method of claim 11, wherein at an end of a periodic predetermined time period, all clusters in the set of clusters are deleted, and the set of clusters is populated with new clusters formed with points acquired in a time period before the end of the corresponding predetermined time period.

14. The method of claim 11, wherein at an end of a periodic predetermined time period, a set of the clusters with a least number of points in the set of clusters is deleted.

15. A method of providing position clustering data in a wireless terminal, comprising:
   maintaining a set of clusters in a processing system by storing a rectangular boundary of each cluster in the set of clusters, a centroid within each cluster, and a number of the points within each cluster;
   periodically obtaining GPS coordinates of the wireless terminal, the GPS coordinates comprising a latitude and a longitude of a position of the wireless terminal, each latitude and longitude pair being a point;
   creating a new cluster in the set of clusters when an obtained point is not bound by any cluster in the set of clusters;
   adding an obtained point to a cluster in the set of clusters when the cluster bounds the obtained point by adjusting the rectangular boundary of the cluster, adjusting the centroid within the cluster, and adjusting the number of the points within the cluster, wherein one or more of the adjusting the rectangular boundary and the adjusting the centroid is based respectively on a predetermined distance from the obtained point, and on a latitude and a longitude of the points in the cluster;
   merging a first cluster and a second cluster in the set of clusters into a new cluster when an obtained point is bound by each of the first cluster and the second cluster; and
   displaying the set of clusters on a display of the wireless terminal.

16. An apparatus for wireless communication, comprising:
   means for maintaining a set of clusters by storing a rectangular boundary of each cluster in the set of clusters, a centroid within each cluster, and a number of the points within each cluster; and
   means for adding a point to a cluster in the set of clusters when the cluster bounds the point by adjusting the rectangular boundary of the cluster, adjusting the centroid within the cluster, and adjusting the number of the points within the cluster, wherein one or more of the adjusting the rectangular boundary and the adjusting the centroid is based respectively on a predetermined distance from the point being added, and on a latitude and a longitude of the points in the cluster.

17. The apparatus of claim 16, wherein each point comprises a latitude, a longitude, and a time of acquisition.

18. The apparatus of claim 17, wherein the rectangular boundary is defined by a first latitude, a second latitude north of the first latitude, a first longitude, and a second longitude east of the first longitude.

19. The apparatus of claim 18, wherein the predetermined distance is one or more of a predetermined longitude distance and a predetermined latitude distance and when the point is added to the cluster, the rectangular boundary is adjusted as follows:
   the first longitude is set equal to the longitude of the point minus the predetermined longitude distance when the longitude of the point minus the first longitude is less than the predetermined longitude distance,
   the second longitude is set equal to the longitude of the point plus the predetermined longitude distance when the second longitude minus the longitude of the point is less than the predetermined longitude distance,
   the first latitude is set equal to the latitude of the point minus the predetermined latitude distance when the latitude of the point minus the first latitude is less than a predetermined latitude distance, and
   the second latitude is set equal to the latitude of the point plus the predetermined latitude distance when the second latitude minus the latitude of the point is less than the predetermined latitude distance.

20. The apparatus of claim 16, wherein when the point is added to the cluster, the number of points within the cluster is incremented by one.

21. The apparatus of claim 16, wherein the centroid is an average latitude and an average longitude of the points within the cluster, and when the point is added to the cluster, the centroid is adjusted as follows:

$$\text{centroid.latitude}_{new} = (N^*\text{centroid.latitude} + p.\text{latitude})/(N+1), \text{ and}$$

$$\text{centroid.longitude}_{new} = (N^*\text{centroid.longitude} + p.\text{longitude})/(N+1),$$

where centroid.latitude is the latitude of the centroid of the cluster before the point is added to the cluster, centroid.longitude is the longitude of the centroid of the cluster before the point is added to the cluster, p.latitude is the latitude of the point, p.longitude is the longitude of the point, and N is the number of points in the cluster before the point is added to the cluster.

22. The apparatus of claim 16, further comprising means for creating a new cluster in the set of clusters when a new point is not bound by a cluster in the set of clusters.

23. The apparatus of claim 22, wherein:
the new point comprises a latitude and a longitude;
the centroid of the new cluster comprises the latitude and the longitude of the new point;
the predetermined distance is one or more of a predetermined longitude distance and a predetermined latitude distance; and
the rectangular boundary is defined by a westernmost longitude equal to the longitude of the new point minus the predetermined longitude distance, an easternmost longitude equal to the longitude of the new point plus the predetermined longitude distance, a southernmost latitude equal to the latitude of the new point minus the predetermined latitude distance, and a northernmost latitude equal to the latitude of the new point plus the predetermined latitude distance.

24. The apparatus of claim 16, further comprising means for merging a first cluster and a second cluster in the set of clusters into a new cluster when a new point is bound by each of the first cluster and the second cluster.

25. The apparatus of claim 24, wherein:
the rectangular boundary of the new cluster is defined by a north latitude, a south latitude, a west longitude, and an east longitude equal to a northernmost latitude, a southernmost latitude, a westernmost longitude, and an easternmost longitude, respectively, of the first cluster and the second cluster;
the centroid of the new cluster is computed as follows:

$$\text{centroid.latitude} = \left( \frac{C1.N * C1.\text{centroid.latitude} + C2.N * C2.\text{centroid.latitude}}{C1.N + C2.N} \right),$$

and $$\text{centroid.longitude} = \left( \frac{C1.N * C1.\text{centroid.longitude} + C2.N * C2.\text{centroid.longitude}}{C1.N + C2.N} \right),$$

where centroid.latitude and centroid.longitude are the latitude and the longitude, respectively, of the centroid of the new cluster; C1.N is the number of points in the first cluster; C1.centroid.latitude and C1.centroid.longitude are the latitude and the longitude, respectively, of the centroid of the first cluster; C2.N is the number of points in the second cluster; and C2.centroid.latitude and C2.centroid.longitude are the latitude and the longitude, respectively, of the centroid of the second cluster; and
the number of points N of the new cluster is computed as follows: N=C1.N+C2.N.

26. The apparatus of claim 16, wherein each point comprises a latitude, a longitude, and a time, and wherein the set of clusters are maintained based on an age of the cluster.

27. The apparatus of claim 26, wherein at an end of a periodic predetermined time period, all clusters in the set of clusters are deleted, and the set of clusters is populated with new clusters formed with newly acquired points.

28. The apparatus of claim 26, wherein at an end of a periodic predetermined time period, all clusters in the set of clusters are deleted, and the set of clusters is populated with new clusters formed with points acquired in a time period before the end of the corresponding predetermined time period.

29. The apparatus of claim 26, wherein at an end of a periodic predetermined time period, a set of the clusters with a least number of points in the set of clusters is deleted.

30. An apparatus for wireless communication, comprising:
means for maintaining a set of clusters by storing a rectangular boundary of each cluster in the set of clusters, a centroid within each cluster, and a number of the points within each cluster;
means for periodically obtaining GPS coordinates of the apparatus, the GPS coordinates comprising a latitude and a longitude of a position of the apparatus, each latitude and longitude pair being a point;
means for creating a new cluster in the set of clusters when an obtained point is not bound by any cluster in the set of clusters;
means for adding an obtained point to a cluster in the set of clusters when the cluster bounds the obtained point by adjusting the rectangular boundary of the cluster, adjusting the centroid within the cluster, and adjusting the number of the points within the cluster, wherein one or more of the adjusting the rectangular boundary and the adjusting the centroid is based respectively on a predetermined distance from the obtained point, and on a latitude and a longitude of the points in the cluster;
means for merging a first cluster and a second cluster in the set of clusters into a new cluster when an obtained point is bound by each of the first cluster and the second cluster; and
means for displaying the set of clusters on a display of the apparatus.

31. An apparatus for wireless communication, comprising:
a processing system configured to:
maintain a set of clusters by storing a rectangular boundary of each cluster in the set of clusters, a centroid within each cluster, and a number of the points within each cluster; and
add a point to a cluster in the set of clusters when the cluster bounds the point by adjusting the rectangular boundary of the cluster, adjusting the centroid within the cluster, and adjusting the number of the points within the cluster, wherein one or more of the adjusting the rectangular boundary and the adjusting the centroid is based respectively on a predetermined distance from the point being added, and on a latitude and a longitude of the points in the cluster.

32. The apparatus of claim 31, wherein each point comprises a latitude, a longitude, and a time of acquisition.

33. The apparatus of claim 32, wherein the rectangular boundary is defined by a first latitude, a second latitude north of the first latitude, a first longitude, and a second longitude east of the first longitude.

34. The apparatus of claim 33, wherein the predetermined distance is one or more of a predetermined longitude distance and a predetermined latitude distance and when the point is added to the cluster, the rectangular boundary is adjusted as follows:
the first longitude is set equal to the longitude of the point minus the predetermined longitude distance when the longitude of the point minus the first longitude is less than the predetermined longitude distance,
the second longitude is set equal to the longitude of the point plus the predetermined longitude distance when the second longitude minus the longitude of the point is less than the predetermined longitude distance,
the first latitude is set equal to the latitude of the point minus the predetermined latitude distance when the latitude of the point minus the first latitude is less than a predetermined latitude distance, and
the second latitude is set equal to the latitude of the point plus the predetermined latitude distance when the second latitude minus the latitude of the point is less than the predetermined latitude distance.

35. The apparatus of claim 31, wherein when the point is added to the cluster, the number of points within the cluster is incremented by one.

36. The apparatus of claim 31, wherein the centroid is an average latitude and an average longitude of the points within the cluster, and when the point is added to the cluster, the centroid is adjusted as follows:

$$centroid.latitude_{new}=(N*centroid.latitude+p.latitude)/(N+1), \text{ and}$$

$$centroid.longitude_{new}=(N*centroid.longitude+p.longitude)/(N+1),$$

where centroid.latitude is the latitude of the centroid of the cluster before the point is added to the cluster, centroid.longitude is the longitude of the centroid of the cluster before the point is added to the cluster, p.latitude is the latitude of the point, p.longitude is the longitude of the point, and N is the number of points in the cluster before the point is added to the cluster.

37. The apparatus of claim 31, wherein the processing system is further configured to create a new cluster in the set of clusters when a new point is not bound by a cluster in the set of clusters.

38. The apparatus of claim 37, wherein:
the new point comprises a latitude and a longitude;
the centroid of the new cluster comprises the latitude and the longitude of the new point;
the predetermined distance is one or more of a predetermined longitude distance and a predetermined latitude distance; and
the rectangular boundary is defined by a westernmost longitude equal to the longitude of the new point minus the predetermined longitude distance, an easternmost longitude equal to the longitude of the new point plus the predetermined longitude distance, a southernmost latitude equal to the latitude of the new point minus the predetermined latitude distance, and a northernmost latitude equal to the latitude of the new point plus the predetermined latitude distance.

39. The apparatus of claim 31, wherein the processing system is further configured to merge a first cluster and a second cluster in the set of clusters into a new cluster when a new point is bound by each of the first cluster and the second cluster.

40. The apparatus of claim 39, wherein:
the rectangular boundary of the new cluster is defined by a north latitude, a south latitude, a west longitude, and an east longitude equal to a northernmost latitude, a southernmost latitude, a westernmost longitude, and an easternmost longitude, respectively, of the first cluster and the second cluster;
the centroid of the new cluster is computed as follows:

$$centroid.latitude = \left(\frac{C1.N*C1.centroid.latitude + C2.N*C2.centroid.latitude}{C1.N + C2.N}\right),$$

and $$centroid.longitude = \left(\frac{C1.N*C1.centroid.longitude + C2.N*C2.centroid.longitude}{C1.N + C2.N}\right),$$

where centroid.latitude and centroid.longitude are the latitude and the longitude, respectively, of the centroid of the new cluster; C1.N is the number of points in the first cluster; C1.centroid.latitude and C1.centroid.longitude are the latitude and the longitude, respectively, of the centroid of the first cluster; C2.N is the number of points in the second cluster; and C2.centroid.latitude and C2.centroid.longitude are the latitude and the longitude, respectively, of the centroid of the second cluster; and
the number of points N of the new cluster is computed as follows: N=C1.N+C2.N.

41. The apparatus of claim 31, wherein each point comprises a latitude, a longitude, and a time, and wherein the set of clusters are maintained based on an age of the cluster.

42. The apparatus of claim 41, wherein at an end of a periodic predetermined time period, all clusters in the set of clusters are deleted, and the set of clusters is populated with new clusters formed with newly acquired points.

43. The apparatus of claim 41, wherein at an end of a periodic predetermined time period, all clusters in the set of clusters are deleted, and the set of clusters is populated with new clusters formed with points acquired in a time period before the end of the corresponding predetermined time period.

44. The apparatus of claim 41, wherein at an end of a periodic predetermined time period, a set of the clusters with a least number of points in the set of clusters is deleted.

45. An apparatus for wireless communication, comprising:
a processing system configured to:
    maintain a set of clusters by storing a rectangular boundary of each cluster in the set of clusters, a centroid within each cluster, and a number of the points within each cluster;
    periodically obtain GPS coordinates of the wireless terminal, the GPS coordinates comprising a latitude and a longitude of a position of the wireless terminal, each latitude and longitude pair being a point;
    create a new cluster in the set of clusters when an obtained point is not bound by any cluster in the set of clusters;
    add an obtained point to a cluster in the set of clusters when the cluster bounds the obtained point by adjusting the rectangular boundary of the cluster based on a predetermined distance from the obtained point, adjusting the centroid within the cluster, and adjusting the number of the points within the cluster;
    add an obtained point to a cluster in the set of clusters when the cluster bounds the obtained point by adjusting the rectangular boundary of the cluster, adjusting the centroid within the cluster, and adjusting the number of the points within the cluster, wherein one or more of the adjusting the rectangular boundary and the adjusting the centroid is based respectively on a predetermined distance from the obtained point, and on a latitude and a longitude of the points in the cluster;
    merge a first cluster and a second cluster in the set of clusters into a new cluster when an obtained point is bound by each of the first cluster and the second cluster; and
    display the set of clusters on a display of the wireless terminal.

46. A computer program product, comprising:
a non-transitory computer-readable medium comprising code for:
    maintaining a set of clusters by storing a rectangular boundary of each cluster in the set of clusters, a centroid within each cluster, and a number of the points within each cluster; and adding a point to a cluster in the set of clusters when the cluster bounds the point by adjusting the rectangular boundary of the cluster, adjusting the centroid within the cluster, and adjusting the number of the points within the cluster, wherein one or more of the adjusting the rectangular boundary and the adjusting the centroid is based respectively on a predetermined distance from the point being added, and on a latitude and a longitude of the points in the cluster.

47. The computer program product of claim 46, wherein each point comprises a latitude, a longitude, and a time of acquisition.

48. The computer program product of claim 47, wherein the rectangular boundary is defined by a first latitude, a second latitude north of the first latitude, a first longitude, and a second longitude east of the first longitude.

49. The computer program product of claim 48, wherein the predetermined distance is one or more of a predetermined longitude distance and a predetermined latitude distance and when the point is added to the cluster, the rectangular boundary is adjusted as follows:
the first longitude is set equal to the longitude of the point minus the predetermined longitude distance when the longitude of the point minus the first longitude is less than the predetermined longitude distance,
the second longitude is set equal to the longitude of the point plus the predetermined longitude distance when the second longitude minus the longitude of the point is less than the predetermined longitude distance,
the first latitude is set equal to the latitude of the point minus the predetermined latitude distance when the latitude of the point minus the first latitude is less than a predetermined latitude distance, and
the second latitude is set equal to the latitude of the point plus the predetermined latitude distance when the second latitude minus the latitude of the point is less than the predetermined latitude distance.

50. The computer program product of claim 46, wherein when the point is added to the cluster, the number of points within the cluster is incremented by one.

51. The computer program product of claim 46, wherein the centroid is an average latitude and an average longitude of the points within the cluster, and when the point is added to the cluster, the centroid is adjusted as follows:

$$\text{centroid.latitude}_{new} = (N^* \text{centroid.latitude} + p.\text{latitude})/(N+1), \text{ and}$$

$$\text{centroid.longitude}_{new} = (N^* \text{centroid.longitude} + p.\text{longitude})/(N+1)'$$

where centroid.latitude is the latitude of the centroid of the cluster before the point is added to the cluster, centroid.longitude is the longitude of the centroid of the cluster before the point is added to the cluster, p.latitude is the latitude of the point, p.longitude is the longitude of the point, and N is the number of points in the cluster before the point is added to the cluster.

52. The computer program product of claim 46, wherein the computer-readable medium further comprises code for creating a new cluster in the set of clusters when a new point is not bound by a cluster in the set of clusters.

53. The computer program product of claim 52, wherein:
the new point comprises a latitude and a longitude;
the centroid of the new cluster comprises the latitude and the longitude of the new point;
the predetermined distance is one or more of a predetermined longitude distance and a predetermined latitude distance; and
the rectangular boundary is defined by a westernmost longitude equal to the longitude of the new point minus the predetermined longitude distance, an easternmost longitude equal to the longitude of the new point plus the predetermined longitude distance, a southernmost latitude equal to the latitude of the new point minus the predetermined latitude distance, and a northernmost latitude equal to the latitude of the new point plus the predetermined latitude distance.

54. The computer program product of claim 46, wherein the computer-readable medium further comprises code for merging a first cluster and a second cluster in the set of clusters into a new cluster when a new point is bound by each of the first cluster and the second cluster.

55. The computer program product of claim 54, wherein:
the rectangular boundary of the new cluster is defined by a north latitude, a south latitude, a west longitude, and an east longitude equal to a northernmost latitude, a southernmost latitude, a westernmost longitude, and an easternmost longitude, respectively, of the first cluster and the second cluster;
the centroid of the new cluster is computed as follows:

$$\text{centroid.latitude} = \left(\frac{C1.N * C1.\text{centroid.latitude} + C2.N * C2.\text{centroid.latitude}}{C1.N + C2.N}\right),$$

and $$\text{centroid.longitude} = \left(\frac{C1.N * C1.\text{centroid.longitude} + C2.N * C2.\text{centroid.longitude}}{C1.N + C2.N}\right),$$

where centroid.latitude and centroid.longitude are the latitude and the longitude, respectively, of the centroid of the new cluster; C1.N is the number of points in the first cluster; C1.centroid.latitude and C1.centroid.longitude are the latitude and the longitude, respectively, of the centroid of the first cluster; C2.N is the number of points in the second cluster; and C2.centroid.latitude and C2.centroid.longitude are the latitude and the longitude, respectively, of the centroid of the second cluster; and
the number of points N of the new cluster is computed as follows: N=C1.N+C2.N.

56. The computer program product of claim 46, wherein each point comprises a latitude, a longitude, and a time, and wherein the set of clusters are maintained based on an age of the cluster.

57. The computer program product of claim 56, wherein at an end of a periodic predetermined time period, all clusters in the set of clusters are deleted, and the set of clusters is populated with new clusters formed with newly acquired points.

58. The computer program product of claim 56, wherein at an end of a periodic predetermined time period, all clusters in the set of clusters are deleted, and the set of clusters is populated with new clusters formed with points acquired in a time period before the end of the corresponding predetermined time period.

59. The computer program product of claim 56, wherein at an end of a periodic predetermined time period, a set of the clusters with a least number of points in the set of clusters is deleted.

60. A computer program product, comprising:
a non-transitory computer-readable medium comprising code for:

maintaining a set of clusters by storing a rectangular boundary of each cluster in the set of clusters, a centroid within each cluster, and a number of the points within each cluster;

periodically obtaining GPS coordinates of a wireless terminal, the GPS coordinates comprising a latitude and a longitude of a position of the wireless terminal, each latitude and longitude pair being a point;

creating a new cluster in the set of clusters when an obtained point is not bound by any cluster in the set of clusters;

adding an obtained point to a cluster in the set of clusters when the cluster bounds the obtained point by adjusting the rectangular boundary of the cluster, adjusting the centroid within the cluster, and adjusting the number of the points within the cluster, wherein one or more of the adjusting the rectangular boundary and the adjusting the centroid is based respectively on a predetermined distance from the obtained point, and on a latitude and a longitude of the points in the cluster;

merging a first cluster and a second cluster in the set of clusters into a new cluster when an obtained point is bound by each of the first cluster and the second cluster; and displaying the set of clusters on a display of the wireless terminal.

\* \* \* \* \*